United States Patent
Barry

[11] Patent Number: 5,934,560
[45] Date of Patent: Aug. 10, 1999

[54] ENGINE FUEL INJECTOR

[75] Inventor: Hubert M. Barry, Lethbridge, Canada

[73] Assignee: Power B International Inc., Lethbridge, Canada

[21] Appl. No.: 08/783,753

[22] Filed: Jan. 16, 1997

Related U.S. Application Data

[63] Continuation-in-part of application No. 08/587,322, Jan. 16, 1996, Pat. No. 5,685,462.

[51] Int. Cl.$^6$ .......................... F02M 47/02; F02M 61/20
[52] U.S. Cl. ...................... 239/89; 239/553.9; 239/584; 251/57
[58] Field of Search ............................... 239/88, 89, 93, 239/96, 533.2, 533.3, 533.9, 584; 251/57, 30.01

[56] References Cited

U.S. PATENT DOCUMENTS

| | | |
|---|---|---|
| 3,260,211 | 7/1966 | Bernard . |
| 5,225,623 | 7/1993 | Krasnow ..................................... 89/1.1 |
| 5,404,967 | 4/1995 | Barry ..................................... 184/105.2 |

FOREIGN PATENT DOCUMENTS

| | | | |
|---|---|---|---|
| 117473 | 9/1943 | Australia | ................................... 239/89 |
| 0 687 814 | 4/1995 | European Pat. Off. . | |
| 343639 | 6/1904 | France . | |
| 693493 | 4/1930 | France . | |
| 3942223C1 | 12/1989 | Germany . | |
| 4310062A1 | 3/1993 | Germany . | |
| 636080 | 4/1950 | United Kingdom | ..................... 239/89 |

OTHER PUBLICATIONS

Lincoln Product Bulletin "Pistol Grip Grease Gun" Copyright 1987. Printed in U.S.A.

*Primary Examiner*—Lesley D. Morris
*Attorney, Agent, or Firm*—John Russell Uren

[57] ABSTRACT

An improved fuel injector for an engine has a first passageway, a first outlet for the first passageway and a first fuel inlet for the first passageway. The injector further has a second passageway with a second outlet and a second fuel inlet. First and second pistons are movable within the first and second passageways. An apex chamber is defined by the first and second outlets of the first and second passageways. The injector has an outlet located downstream of the apex chamber. The first and second pistons are movable in the same direction simultaneously and expel fuel from the injector outlet.

10 Claims, 11 Drawing Sheets

ENGINE FUEL INJECTOR

CROSS-REFERNECE TO RELATED APPLICATIONS

This application is a continuation-in-part of application Ser. No. 08/587,322 filed Jan. 16, 1996, now issued as U.S. Pat. No. 5,685,462.

INTRODUCTION

This invention relates to an extruding system and, more particularly, to an extruding system particularly useful in association with a grease gun which extruding system has an improved drive system for operating the movable extruding units.

BACKGROUND OF THE INVENTION

In U.S. Pat. No. 5,404,967 entitled EXTRUDING DEVICE which issued Apr. 11, 1995 and which names the same inventor, the contents of which are incorporated herein by reference, there is disclosed and claimed an extruding device used to extrude grease and other fluids, typically to male grease fittings which provide lubrication for moving parts. The extruding device according to the aforementioned United States patent teaches two pistons, each piston being reciprocal in a respective passageway and being movable simultaneously in the same direction to discharge fluid from the passageways in which they move.

The two pistons reciprocated in their respective passageways. The two pistons were joined to a piston mounting block with a drive pin extending therefrom. The drive pin fitted into a drive groove formed in a rotating cam. As the cam rotated about an axis, the drive block and, therefore, the attached pistons reciprocated.

While the system worked reasonably well, premature failure of the drive pin was noted. It is fairly well determined that the source of the failure lay in the high loading on the pistons caused by the grease in the fluid passageways in which the pistons moved. Because this loading was variable and ranged through a relatively large quantity of forces being exerted on the pistons and likewise because the drive pin was a cantilever type member extending from the mounting block, the forces were sufficient to cause failure of the drive pin thereby causing a prematurely short life of the drive pin and failure of the entire system.

Yet a further disadvantage of the previous system is that the forces were highest, expectedly so, on the power stroke of the extruding operation. Thus, if failure was anticipated, it would be logical to expect it to occur on the power stroke. The design of the drive system of the extruding apparatus according to the '967 patent did nothing to assist a reduction in these forces and a more even application of force throughout the power and suction strokes of the system.

SUMMARY OF THE INVENTION

According to one aspect of the invention, there is provided an extruding apparatus to extrude fluid from at least one cylinder having a cylinder axis by a piston mounted for reciprocal movement within said cylinder during power and return strokes, said power stroke of said piston extruding fluid from said cylinder and said return stroke of said piston allowing fluid to enter said cylinder, said piston being operably moved within said cylinder and parallel to said cylinder axis by a crank member having a crank member axis, said crank member having a throw with a throw axis, said throw axis being offset from said crank member axis, said throw being in contact with said piston during said power stroke of said piston, a bias member operable to bias said piston into a contacting relationship with said throw during movement of said piston within said cylinder on said return stroke of said piston, said throw axis moving along a plane which is parallel to said plane of movement of said piston during a substantial portion of said power stroke of said piston.

According to a further aspect of the invention, there is provided an extruding apparatus to extrude fluid from at least one cylinder, said extruding apparatus comprising a piston movable within said cylinder between power and return strokes, a crank rotatable about a crank axis and a throw mounted to said crank, said throw having a throw axis and being rotatable about said crank axis, said throw axis being offset from said crank axis, said apparatus further comprising a bias member operable to move said piston into operable contact with said throw during said return stroke of said piston.

According to a further aspect of the invention, there is provided a fuel injector for an engine comprising a first passageway, a first outlet for said first passageway, a first fuel inlet for said first passageway, a second passageway, a second outlet for said second passageway, a second fuel inlet for said second passageway, a first piston movable within said first passageway, a second piston movable within said second passageway, an injector outlet and an apex chamber upstream of said injector outlet, said apex chamber being defined by said first and second outlets of said first and second passageways, said first and second pistons being movable simultaneously in the same direction over at least a portion of said movement of said pistons, each of said first and second pistons being operable to expel fuel entering said first and second passageways from said injector outlet.

According to yet a further aspect of the invention, there is provided an extruding pump for cleaning pipelines and the like, said extruding pump having a first passageway with a first fluid inlet, a second passageway with a second fluid inlet, a first piston movable within said first passageway, a second piston movable within said second passageway, an outlet area defined by the downstream ends of said first and second passageways, an outlet downstream of said outlet area, a source of power to move said first and second pistons and a valve between said outlet area and said outlet, said valve being movable between open and closed positions, said valve being normally biased in a closed position and being open upon a predetermined pressure being reached in said outlet area.

According to a further aspect of the invention, there is provided a hydraulic jack for applying force to an object, said jack having a lifting piston movable between retracted and extended positions, a first passageway having a first downstream end and a first fluid inlet, a second passageway having a second downstream end and a second fluid inlet, a first piston movable within said first passageway, a second piston movable within said second passageway, an outlet area defined by said first and second downstream ends, an outlet downstream of said outlet area, a valve member between said outlet area and said outlet, said valve member moving between closed and open positions, said valve member being biased to said closed position and moving to said open position upon a predetermined pressure being reached within said fluid in said outlet area, said fluid being operable to move said lifting piston from one of said retracted or extended positions to the other of said retracted or extended positions.

According to yet a further aspect of the invention, there is provided a water pistol or water rifle having a barrel, said barrel having an outlet to expel water, said water pistol or water rifle further comprising a first passageway, a first water inlet for said first passageway, a second passageway, a second water inlet for said second passageway, a first piston movable within said first passageway, a second piston movable within said second passageway, said first passageway having a first downstream end, said second passageway having a second downstream end, an outlet area defined by said first and second downstream ends, a valve member between said outlet of said barrel and said outlet area, said valve member being movable between open and closed positions, said valve member being biased into said closed position and being movable to said open position upon said pressure in said outlet area exceeding a predetermined quantity.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
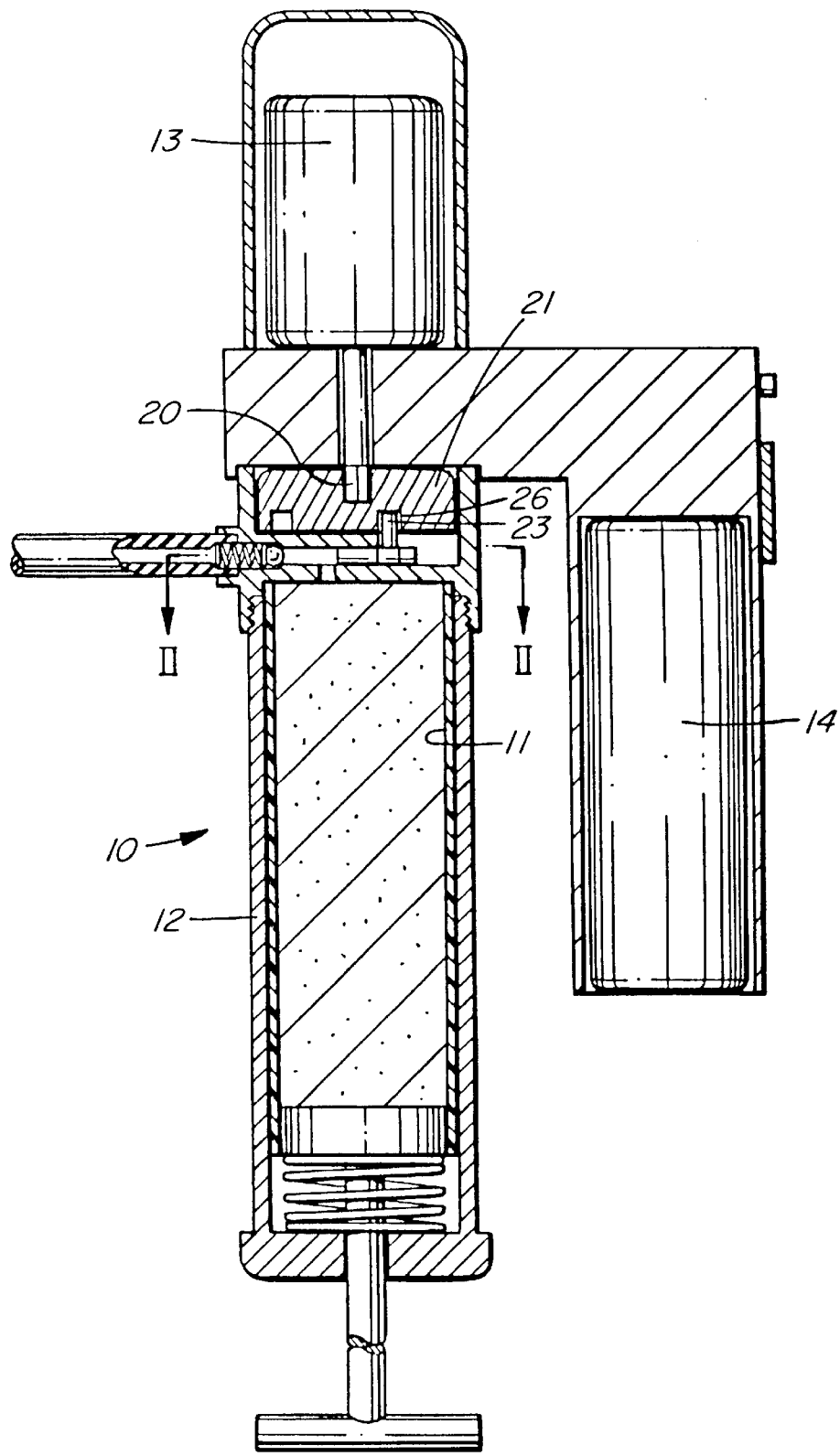
FIG. 1 is a diagrammatic partial section side view of the grease gun or extruding device according to U.S. Pat. No. 5,404,967.
Figure 2:
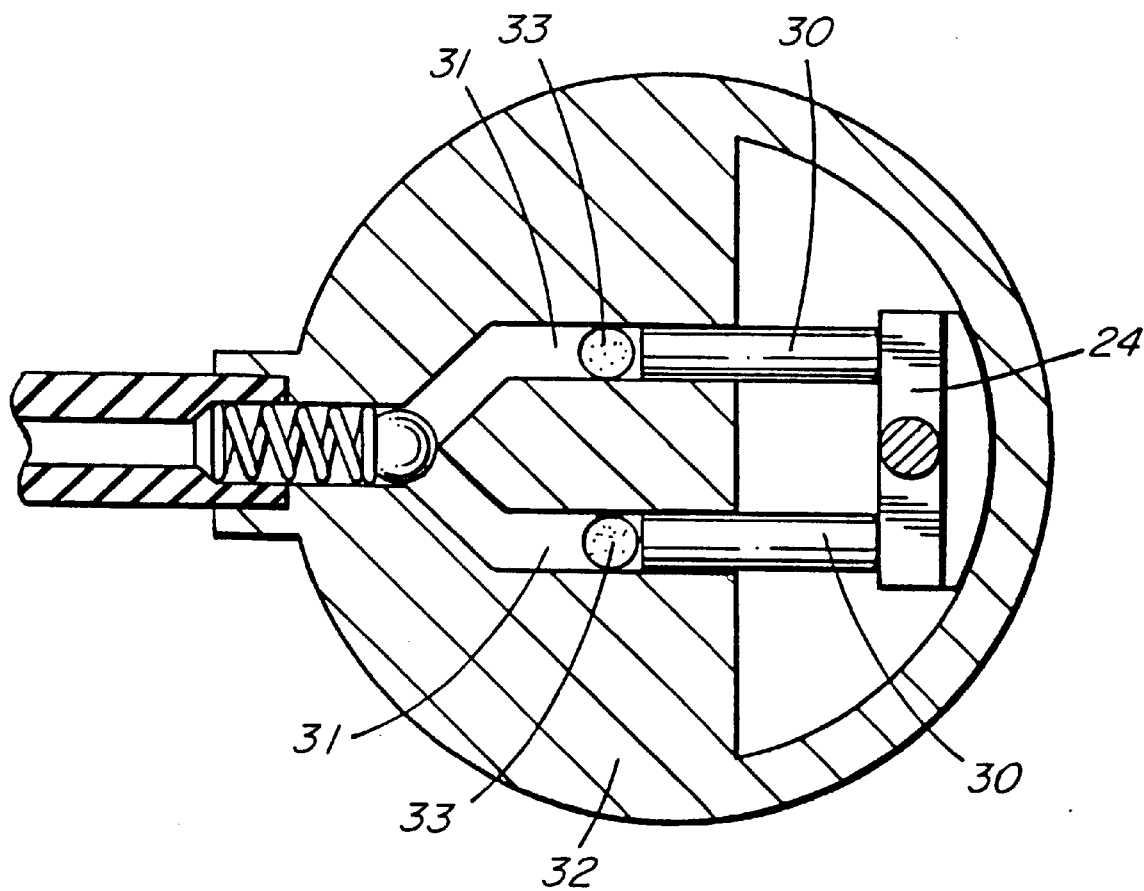
FIG. 2 is sectional view of the drive system of the extruding device according to the '967 patent taken along II—II of FIG. 1.

Reference is now made to FIG. 1 which illustrates a grease gun according to U.S. Pat. No. 5,404,967. Briefly, the grease gun generally illustrated at 10 comprises a cartridge 11 mounted within a cartridge housing 12. A motor 13 which is electrically operated by a battery 14 rotates a shaft 20 connected thereto. Shaft 20 rotates a cam 21 with a cam groove 26 machined therein. A drive pin 23 is in operable contact with the cam groove 26 and is connected to a piston mounting block 24 (FIG. 2).

As the cam 21 rotates, the drive pin 23 will move along a path parallel to the path 25 of pistons 30. However, the force applied to the drive pin 23 by the cam groove 26 will not act along the piston path 25 but will exert force on the drive pin 23 at various angles to the piston path 25 depending on the position of the cam 21 as it rotates about the axis of shaft 20.

The disadvantages of the prior art just described are evident. First, the drive pin 23 is a cantilever type arrangement which protrudes from the piston mounting block 24. As the pistons 30 encounter significant resistance from the grease within the cylinders 31 in which the pistons 30 move, high forces will be exerted on the drive pin 23 by the cam groove 26 in which the drive pin 23 is moving in order to extrude the fluid which conveniently will be grease. Pressure in the range of 10000 p.s.i. is necessary and this pressure clearly results in high loading between the cam groove 26 and the drive pin 23. Thus, premature failure of the drive pin 23 is possible and probable according to the design without taking costly efforts to enhance the strength of the drive pin 23 and cam groove 26. Likewise, and secondly, the force of the cam groove 26 on the drive pin 23 is not parallel to the path of the pistons 30. High side loading on the pistons 30 and the housing 32 results and again, dictates a stronger material which increases tooling and parts costs.

Figure 3:
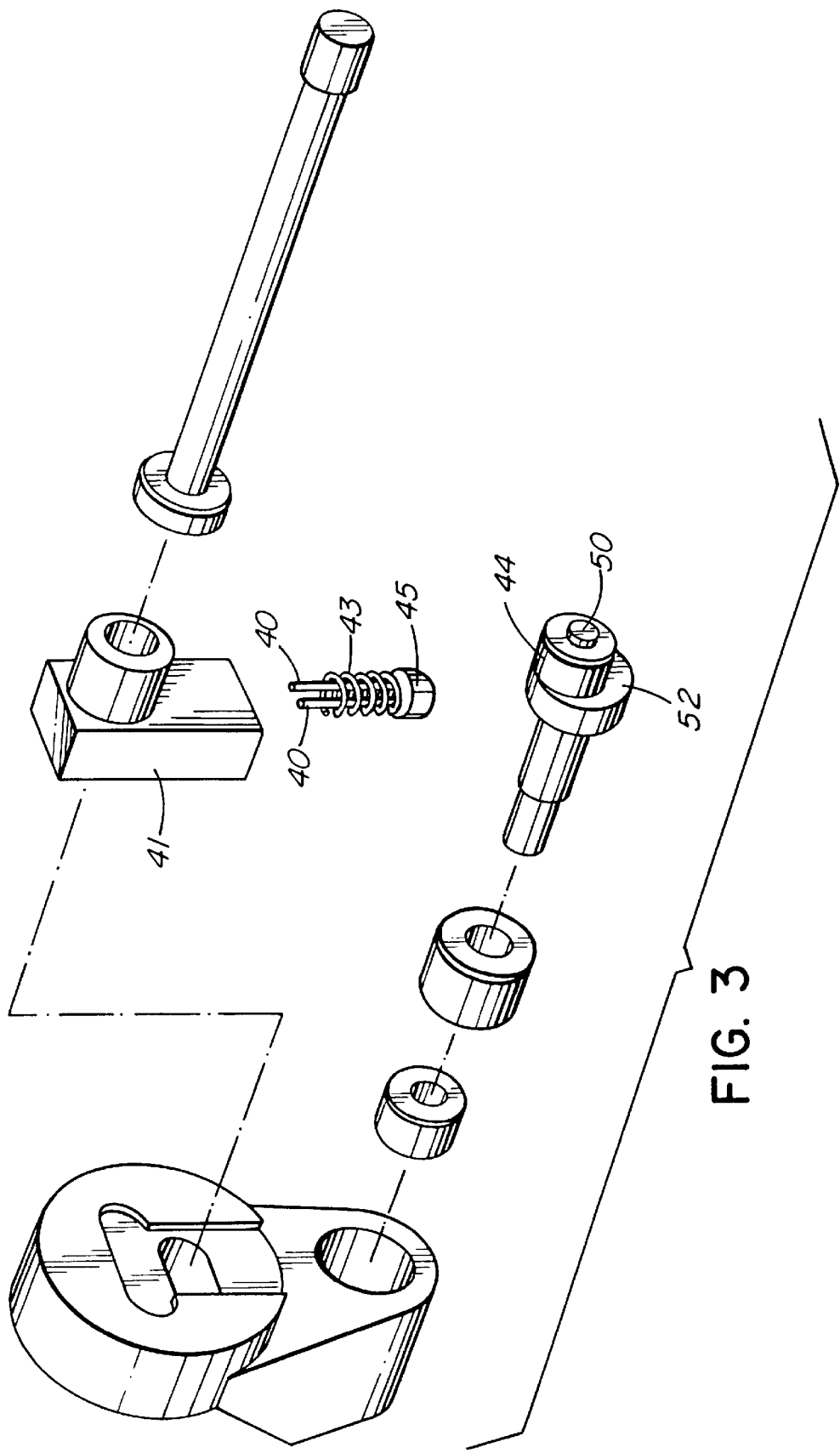
FIG. 3 is an exploded view of the drive system according to the present invention.
Figure 4A:
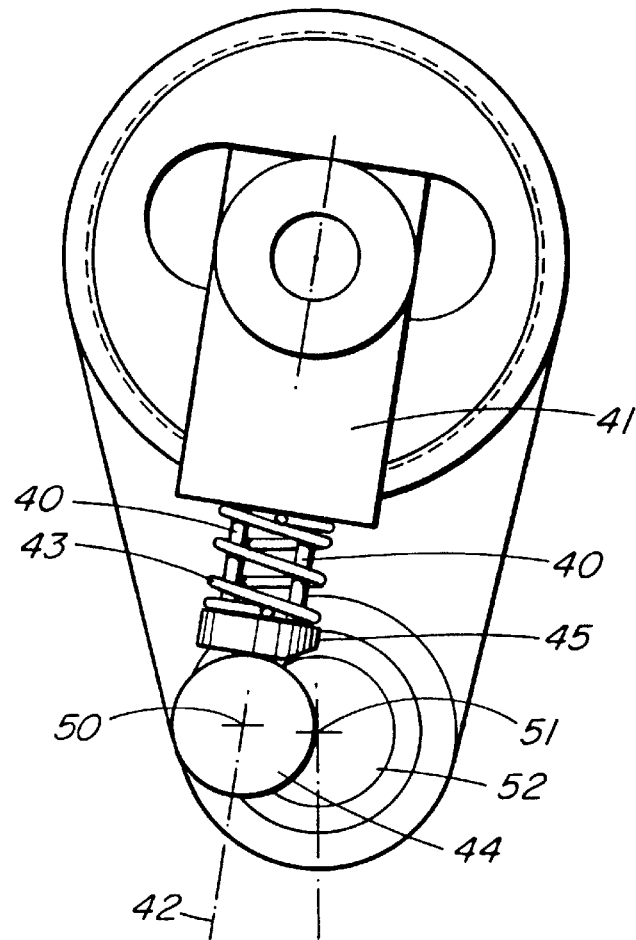
FIG. 4A is a diagrammatic plan view of the drive system according to the present invention.

Reference is now made to FIGS. 3, 4A, 4B and 5. A pair of pistons 40 move within a piston housing or pump casing 41 along a piston path or axis 42 (FIG. 4A). Grease or fluid is supplied to the piston housing 41 in the same manner as illustrated in FIG. 2 i.e., through the inlet ports 33. The pistons 40 are connected to a piston mounting block 45 and a biasing member, conveniently a spring 43 acts between the piston housing 41 and the piston mounting block 45 to maintain the piston mounting block 45 in contact with a throw 44 having a throw axis 50 which, of course, is offset from the crank axis 51 of crank 52. The crank 52 is rotated by a motor (not illustrated) similar to the rotation of the shaft 20 in the prior art embodiment of FIG. 1.

It is desirable to reduce side loading on the pistons 40 as much as practically possible after the pistons 40 have reached their top dead center position. To that end, a relief angle 46 (FIG. 4B) can be conveniently provided on the trailing edge of the mounting block 45 as illustrated.

OPERATION

In operation, battery power will be applied to the motor (not illustrated) and by a control (not illustrated), the operator will commence operation of the crank 52 (FIGS. 3 and 4). The throw 44 will rotate with crank 52 and spring 43 will maintain the piston mounting block 45 in contact with the throw 44 as it rotates.

Figure 4B:
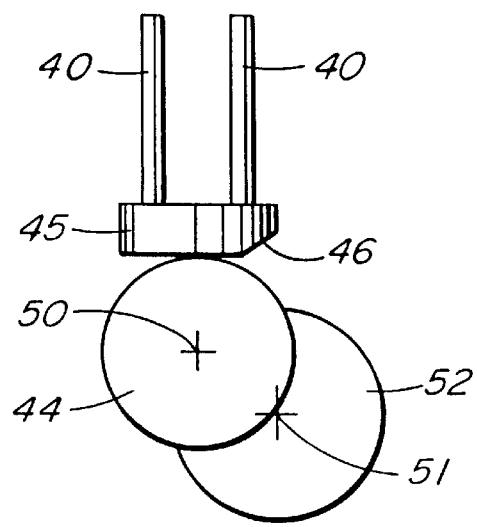
FIG. 4B is a diagrammatic plan view similar to FIG. 4A but particularly illustrating a relief angle formed on the piston mounting block.

On the power stroke of the pistons 40 (i.e., when grease is being extruded from the piston housing 41), the pistons 40 will move inwardly relative to the piston housing 41 (FIG. 4) as the crank 52 rotates clockwise as seen in FIGS. 4A and 4B. Because the axis 42 of the piston housing 41 and, consequently, the axis 42 of pistons 40 is offset to one side of the axis of crank 52, the axis 50 of throw 44 will more closely approximate the axis 42 during the power stroke of the pistons 40 and the forces applied to the piston mounting block 45 by the throw 44 will generally be perpendicular thereto, particularly during the period of maximum movement of the throw 44 over a given time period during the power stroke (i.e., when the throw is 90 degrees from its top dead center position). Sidewise loading on the pistons 44 is thereby considerably reduced or substantially eliminated during the power stroke of the pistons 40.

Following the power stroke of the pistons 43, the throw will, of course, exert a force on the piston mounting block 45, that will allow for sidewise loading between the pistons 40 and the piston housing 41. However, the absence of any force required to extrude the fluid from the piston housing will dictate sidewise forces only a fraction of those occurring on the power stroke and these forces are not of concern in designing the apparatus. These forces are provided only by the spring force between the piston mounting block 45 and the piston housing 41 which maintains the piston mounting block 45 in contact with the throw 44 during the return stroke.

Figure 5A:
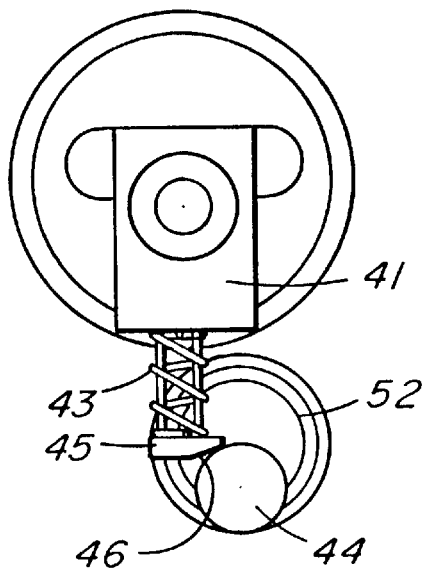
FIG. 5 is a series of plan views similar to that of FIGS. 4A and 4B but illustrating the movement of the pistons during their power or extruding strokes.
Figure 5B:
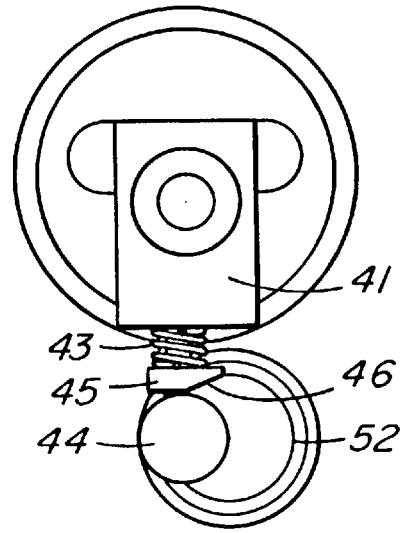
Figure 5C:
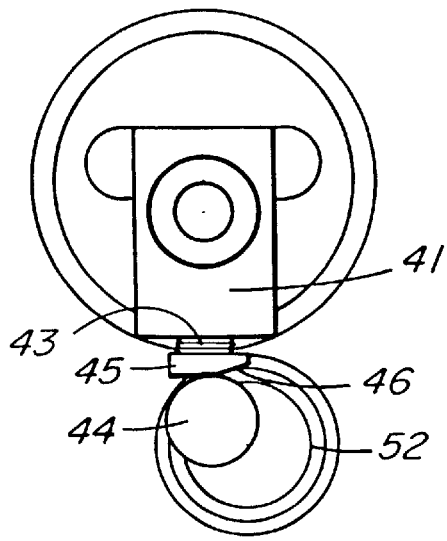
Figure 6:
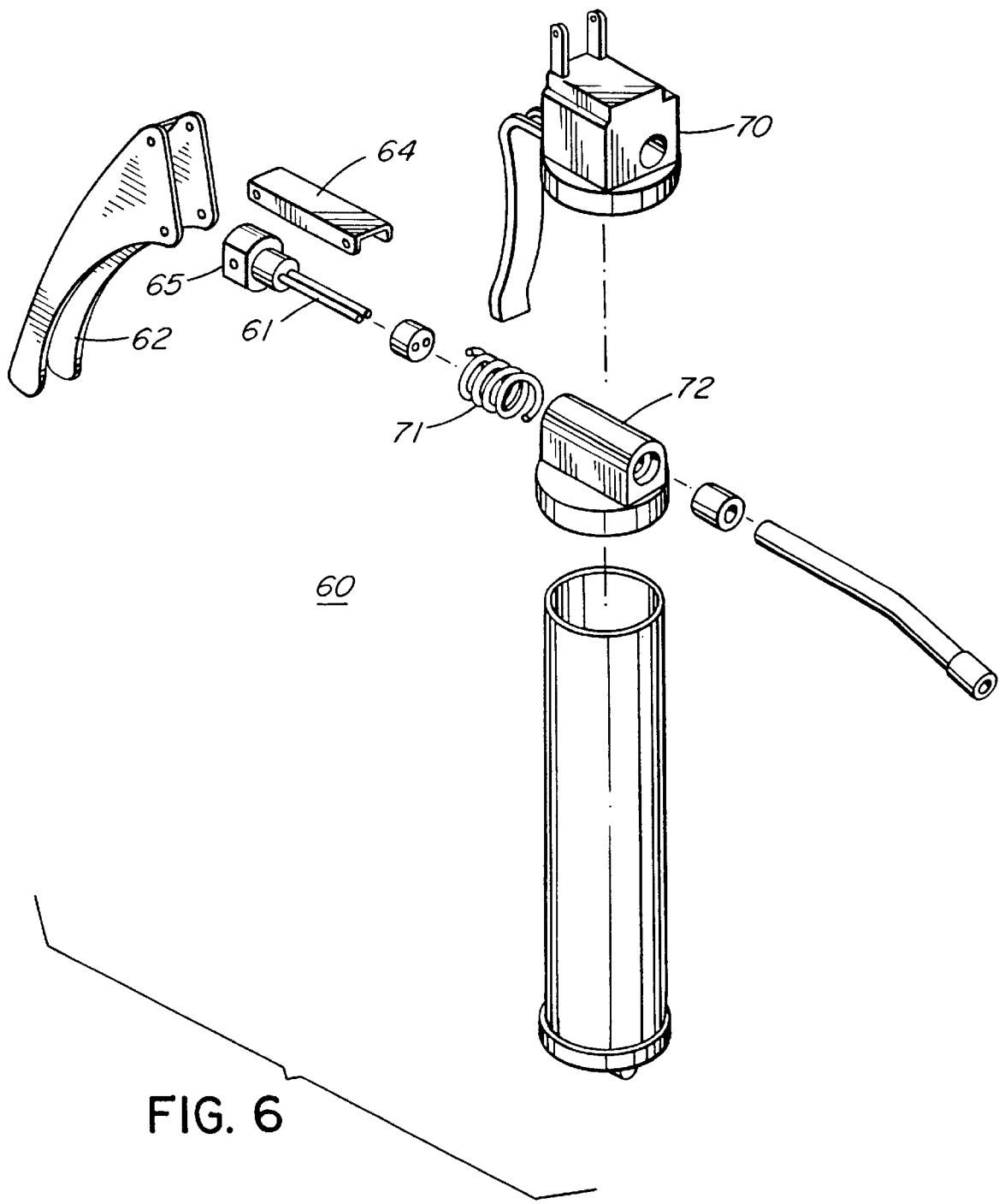
FIG. 6 is a view of an extruding device according to a further embodiment of the invention which is manually or hand operated without a source of power.

Reference is now made to FIG. 6 which illustrates a manually operated extruding device, conveniently a grease gun generally illustrated at 60. As described, however, the force provided on the pistons 61 is not supplied by a motor but, rather, manually by the operator who exerts force on a handle 62 which is connected to the piston mounting block 63 and to a link 64 which extends on the opposite end to a grease gun case 70. A spring 71 provides return force on the pistons 61 following the power stroke and moves the handle 62 to its rest position as illustrated in FIG. 5B.

In operation, the force exerted on the pistons 61 by the handle 62 acting on the piston mounting block 63 will be axially along the same path as that in which the pistons 61 move. Thus, there is little or no side loading on the pistons 61 and little sidewise loading between the pistons 61 and the pump housing 72 in either the power or return strokes of the pistons 61.

Figure 7:
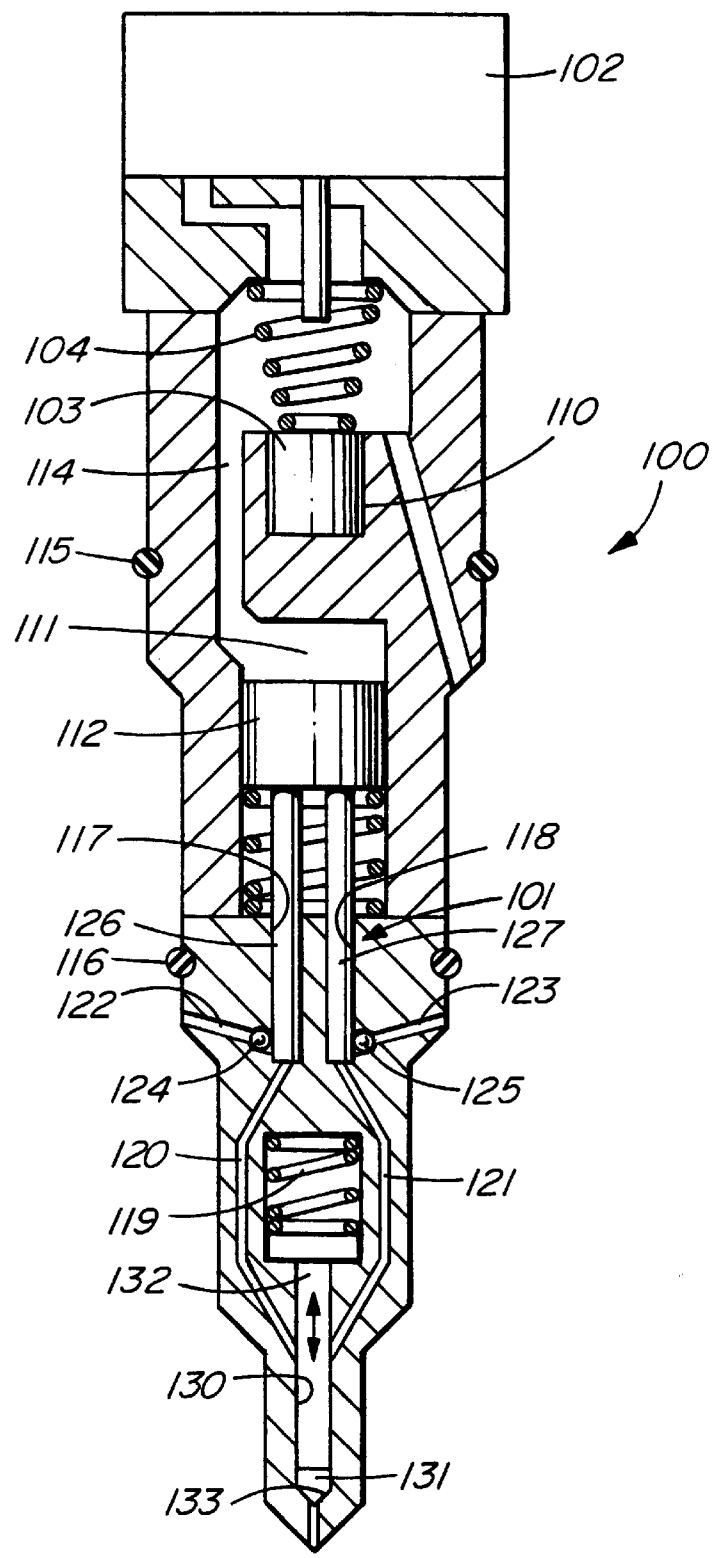
FIG. 7 is a diagrammatic side view of an engine injector according to the invention in which a solenoid supplies power to the dual piston drive assembly.
Figure 8:
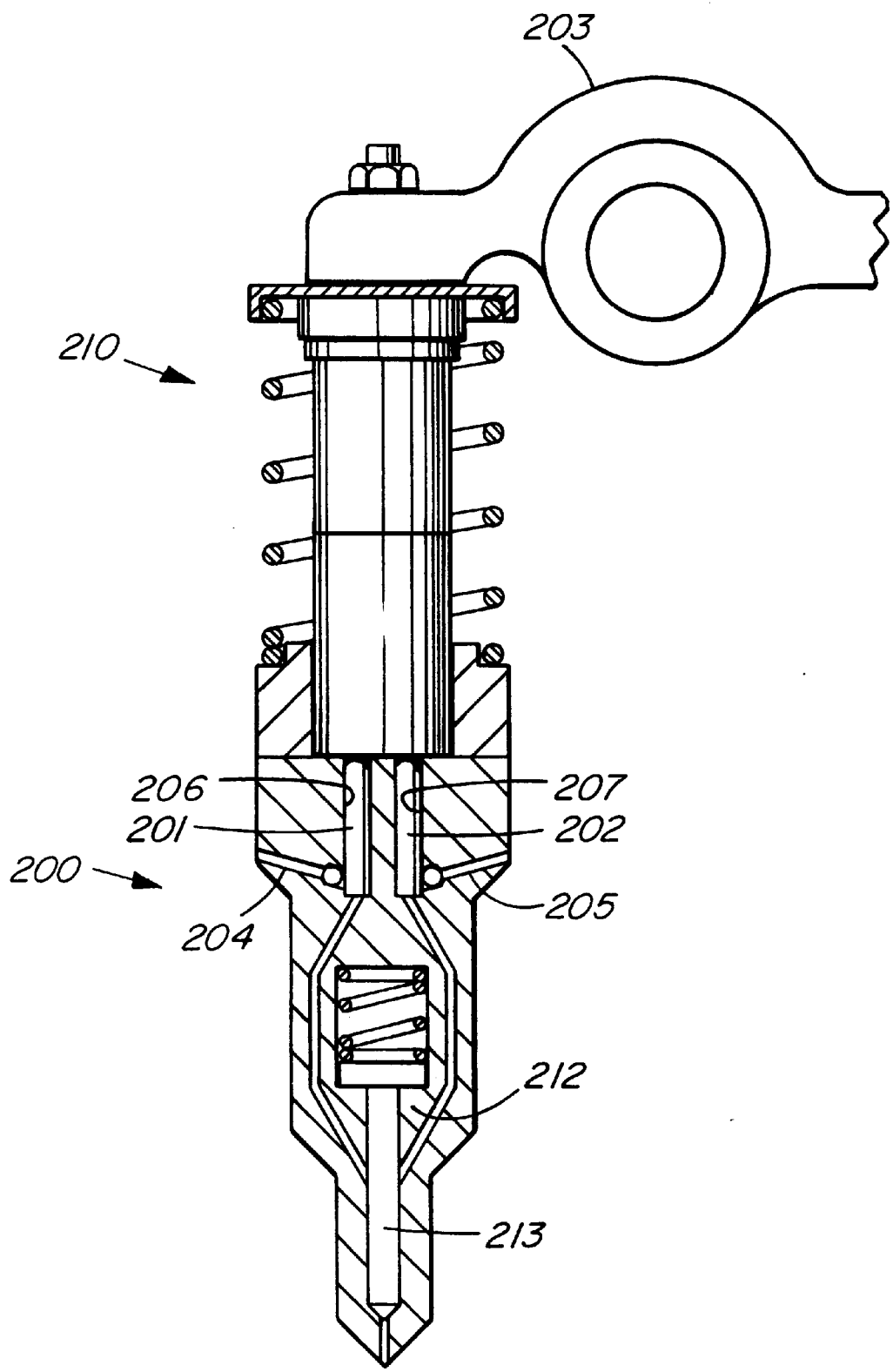
FIG. 8 is diagrammatic side view of an engine injector similar to the injector of FIG. 7 but wherein the power source is a rotating rocker arm.

In a further embodiment of the invention, there is disclosed an electronic fuel injector for an engine (not illustrated), the injector being generally illustrated at 100 in FIGS. 7 and 8. The electronic fuel injector 100 utilizes a dual piston assembly generally illustrated at 101 according to the invention.

The fuel injector 100 comprises a solenoid 102, a poppet valve 103, a spring 104 to bias the poppet valve 103 to its closed position and a poppet valve chamber 110 into which oil flows from an oil supply. A pair of seals 115, 116 provide sealing for the injector 100 when installed in an engine. When the poppet valve 103 is opened by the action of solenoid 102, oil flows into the resulting displacement in the poppet valve chamber 110. The resulting increase in oil pressure is transmitted downwards through the oil passage 114 to the plunger chamber 111. The oil applies pressure upon the double plunger 112. When the pressure exerted by the oil is sufficient, the pressure will drive the plunger 112 with its dual pistons 126, 127 downwardly within the fuel cylinders 117, 118.

Each fuel cylinder 117, 118 is independently supplied with fuel, conveniently diesel, from fuel supply lines 122, 123. Check balls 124, 125 prevent fuel flow from the fuel cylinders 117, 118 back into the fuel supply lines 122, 123 on the power stroke of the plunger 112. A further solenoid valve (not illustrated) regulates the flow of diesel fuel into the fuel supply lines 122, 123.

A first fuel passageway 120 leads from cylinder 117 to nozzle chamber 130. A second fuel passageway 121 leads from fuel cylinder 118 to nozzle chamber 130. It is noted that the fuel passageways 120, 121 are considerably smaller in diameter than the diameters of the fuel cylinders 117, 118.

In operation and upon the desired oil pressure being achieved in the oil rail running to the installed injector 100, the operation of the injector 100 is initiated by energizing solenoid 102.

Diesel fuel enters the injector 100 at pressures of, conveniently, forty (40) to sixty (60) p.s.i., through fuel supply lines 122, 123 which serve cylinders 117, 118, respectively. The energized solenoid 102 will attract poppet valve 103. The lift force overcomes the force in spring 104 which biases poppet valve 103 to its closed position.

When poppet valve 103 opens, high pressure oil flows into the injector 100 from an oil supply (not illustrated). The oil fills the plunger chamber 111. The resulting pressure exerted by the oil simultaneously forces the dual plunger assembly 112 with pistons 126, 127 downwardly in fuel cylinders 117, 118 and forces the fuel obtained from the fuel supply lines 122, 123 into the fuel passageways 120, 121 and thence to the nozzle chamber 130 where the fuel passageways 120, 121 meet.

Fuel is supplied, typically, at forty (40) to sixty (60) p.s.i., from the fuel supply lines 122, 123, to the fuel cylinders 117, 118 as the plunger 112 begins its power stroke downwardly as viewed in FIG. 7. Each fuel cylinder 117, 118 is fuelled independently and each fuel cylinder 117, 118 leads to a separate fluid passageway 120, 121, respectively. A solenoid valve (not illustrated) regulates the flow of fuel to the fuel supply lines 122, 123 and check balls 124, 125 in fuel supply lines 122, 123 prevent the fuel in fuel cylinders 117, 118 from returning to the fuel supply lines 122, 123 when the dual piston assembly 112 is on its power stroke. On the power stroke, the dual pistons 112 apply pressure on the diesel fuel in the fuel cylinders 117, 118 and force it into the fluid passageways 120, 121. The pressurized fuel is forced through the fuel passageways 120, 121 and enters the nozzle chamber 130.

When the fuel pressure reaches the predetermined pressure required to open nozzle 132, the fuel in nozzle chamber 130 forces the nozzle tip 131 to disengage from contact with the nozzle seat 133 against the biasing force of spring 119. The pressurized diesel fuel is then injected at high pressure from the nozzle chamber 130 into the firing chamber (not illustrated) of the engine.

Although not yet verified, it is believed that the pressure within the nozzle chamber 130 will increase to approximately 28,000 p.s.i., as compared with 21,000 p.s.i. in conventional injectors.

In a further embodiment of the invention and with reference to FIG. 8, the operation of the dual piston assembly injector 210 with the dual piston assembly generally illustrated at 200 may be initiated by applying direct force to the assembly 200 by way of a rocker arm 203. As the rocker arm 203 rotates, the dual piston assembly 200 and the pistons 201, 202 attached thereto are driven downwardly within fuel cylinders 206, 207, respectively, in a manner as previously described. Fuel is supplied to the fuel cylinders 206, 207 from the fuel supply lines 204, 205 as the pistons 201, 202 begin their downstroke in a manner similar to the FIG. 7 embodiment. Likewise, when the predetermined fuel pressure is reached in nozzle chamber 212, the nozzle 213 opens and fuel is again injected into the firing chamber of the engine.

While the fuel or fluid supplied to each of the fluid cylinders 117, 118 in the injector 100 may come from a single reservoir, a dual fluid or fuel supply is also contemplated. In this event, fluid from one fluid reservoir may be supplied to one fluid supply line 122 and fluid from a second reservoir may be supplied to the second fluid supply line 121. Thus, two (or more) fluids could be mixed within the apex or nozzle chamber 130 where the fluid passageways 120, 121 meet.

Figure 9A:
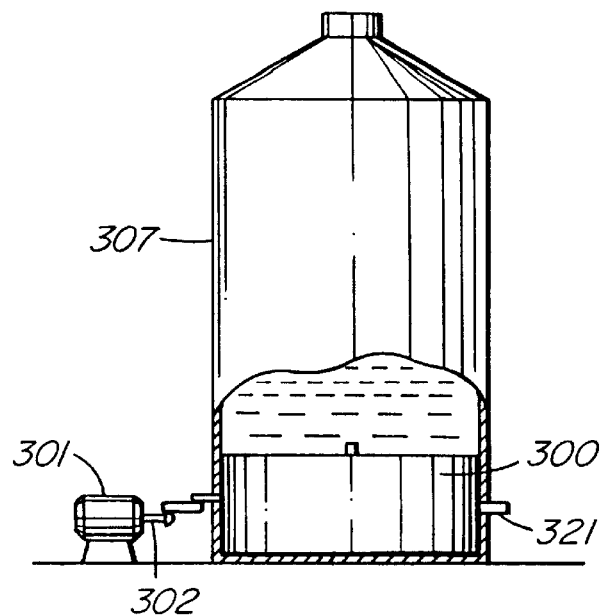
FIGS. 9A and 9B are diagrammatic views of an extruding pump according to the invention which may be utilised in pipeline cleaning operations.
Figure 9B:
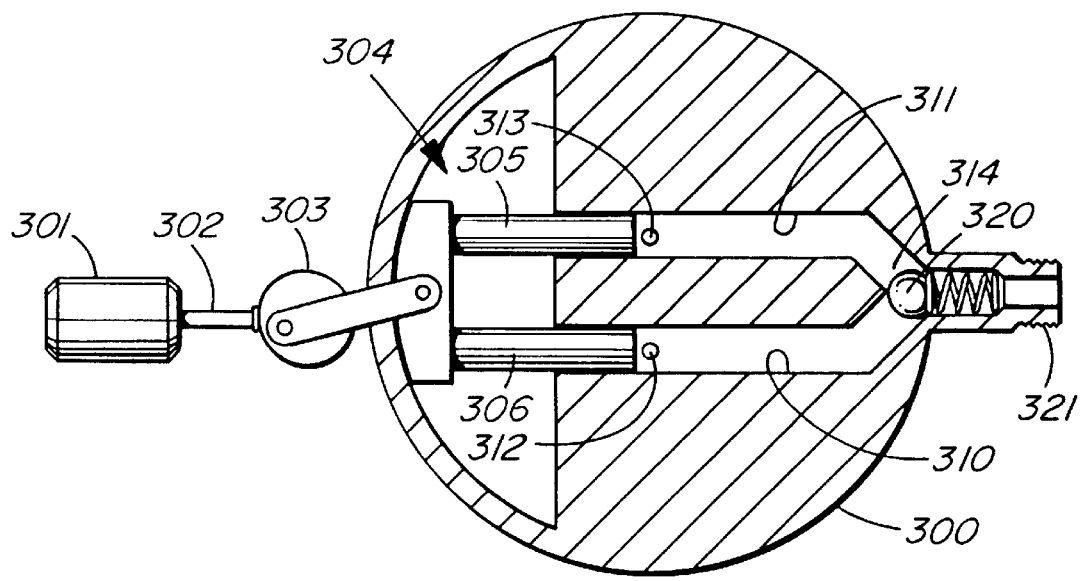

Yet a further embodiment of the invention is illustrated in FIGS. 9A and 9B. This embodiment utilises an extruding pump generally illustrated at 300 in FIG. 9A and shown diagrammatically in FIG. 9B which may be used for cleaning pipelines and the like where deposits are typically formed and reduce the pipeline efficiency. Such locations where the extruding pump 300 may be particularly useful include refineries, pumping stations, oil transfer stations, oil pipelines, industrial plants using processes involving pipelines and other passageways where waste material buildup can occur in such pipelines. The extruding pump 300 forces a viscous fluid of various chemical compositions depending on the particular application through the pipeline being cleaned. The viscous fluid interacts with the deposits formed within the pipelines to remove and/or reduce such deposits.

The extruding pump 300 includes a motor 301 connected to a shaft 302 which, in turn, is connected to a rotating cam 303. Cam 303 is connected to a dual piston assembly generally illustrated at 304 according to the invention. Dual pistons 305, 306 move within the respective parallel fluid cylinders 310, 311. The dual fluid cylinders 310, 311 are independently supplied with viscous fluid from the fluid supply reservoir 307 which fluid is supplied to the fluid ports 312, 313 within the cylinders 310, 311 and which fluid is pressurized within reservoir 307. The two fluid cylinders 310, 311 combine at an apex area 314. At the apex area 314, a check ball valve 320 regulates the flow of fluid into the pump channel 321 which connects with the pipeline (not illustrated) to be cleaned.

In operation, the operator will activate motor 301. Motor 301 drives shaft 302 which, in turn, rotates cam 303. The rotation of cam 303 drives the dual piston assembly 304, the two pistons 305, 306 moving within the fluid cylinders 311, 310, respectively. The viscous fluid conveniently has a viscosity similar to grease and, as the fluid cylinders 310, 311 are filled with fluid from the fluid ports 312, 313, the power stroke of the pistons 305, 306 applies pressure to the fluid within cylinders 310, 311. Check ball 320 will open when the fluid reaches a predetermined pressure and prevent reverse fluid flow from the pump channel 321 to the apex area 314. The pressurized fluid then enters pump channel 321 and proceeds to the interior of the pipelines (not illustrated) being cleaned.

The resulting pressure combined with the fluid causes a reaction that breaks down wax-like and other such deposits on the interior of the fluid pipelines.

Figure 10:
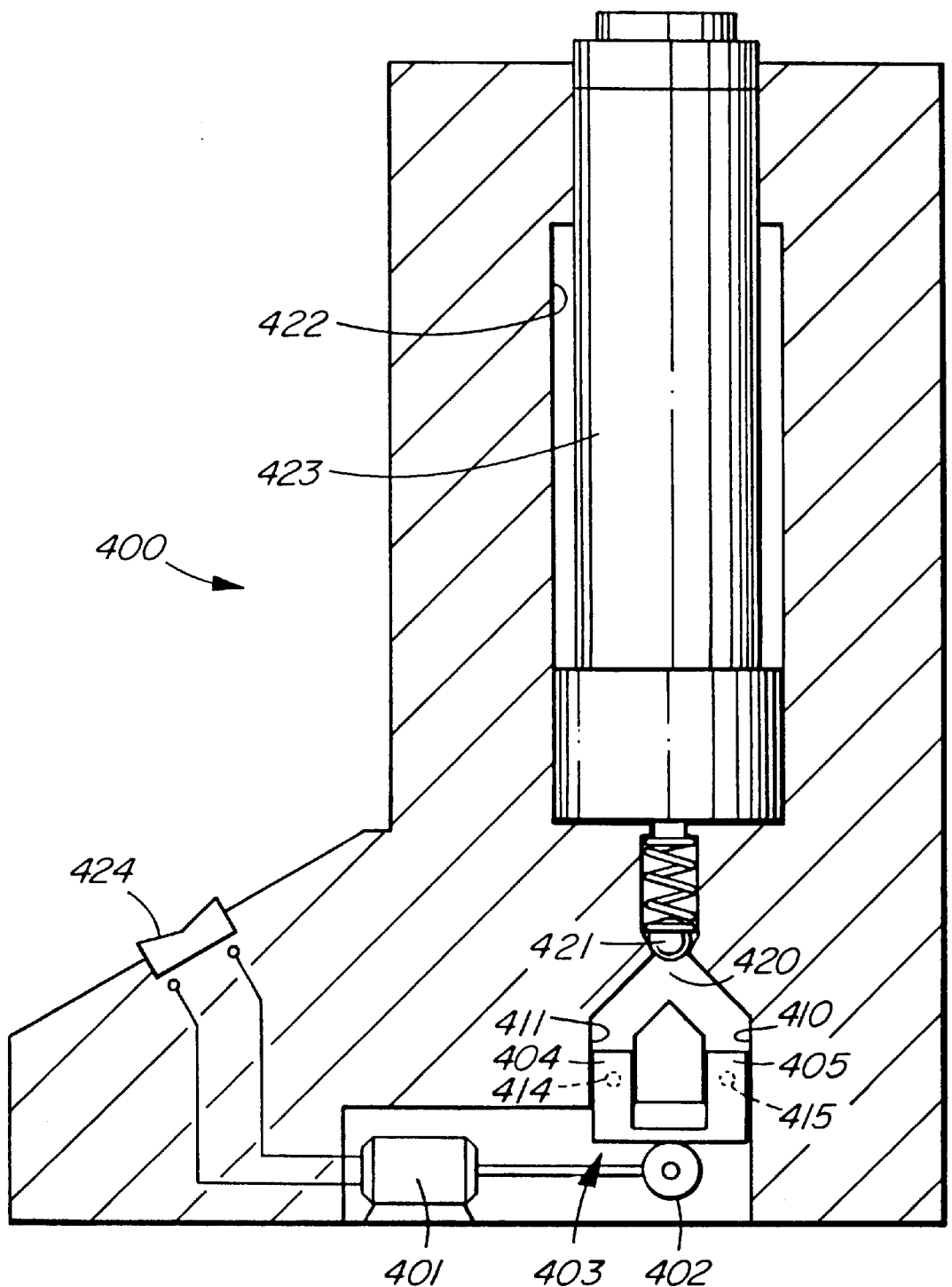
FIG. 10 is a diagrammatic side view of a vehicle jack according to the invention.

Yet a further embodiment according to the invention is illustrated in FIG. 10. In this embodiment, a hydraulic automobile jack is generally illustrated at 400.

Jack 400 is driven by a twelve (12) volt motor 401. Motor 401 receives power through a switch 424 from a twelve (12) volt battery (not shown) which is continually charged in a vehicle (not shown), conveniently a vehicle where the jack 400 is located. Motor 401 drives a cam 402 which applies force to a dual piston assembly generally illustrated at 403 which has pistons 404, 405, reciprocating within parallel cylinders 410, 411, respectively. As cam 402 rotates, the pistons 404, 405 simultaneously move along parallel cylinders 410, 411.

Cylinders 410, 411 are supplied with fluid from two fluid ports 414, 415 prior to the power stroke of pistons 404, 405 in a manner previously described. The power stroke results in increased pressure on the fluid within the fluid cylinders 410, 411. Cylinders 410, 411 join at an apex chamber 420 and at the apex chamber 420. A spring loaded check ball valve 421 prevents fluid from flowing from the reservoir 422 back to the apex chamber 420, until it is desired to do so. When the fluid in the cylinders 410, 411 reaches a sufficient and predetermined pressure in the apex chamber 420, fluid will enter reservoir 422. The increased volume of fluid in the reservoir 422 creates pressure that will displace the main or lifting piston 423, driving it upwardly as viewed in FIG. 10. The main piston 423 will thereby raise a vehicle or other weight positioned above main piston 423.

In operation, the user will position jack 400 under a vehicle such that the piston 423 is properly aligned to lift the vehicle. Jack 400 is activated by operating a switch 424 leading from the twelve (12) volt battery conveniently located in the vehicle being lifted.

Figure 11:
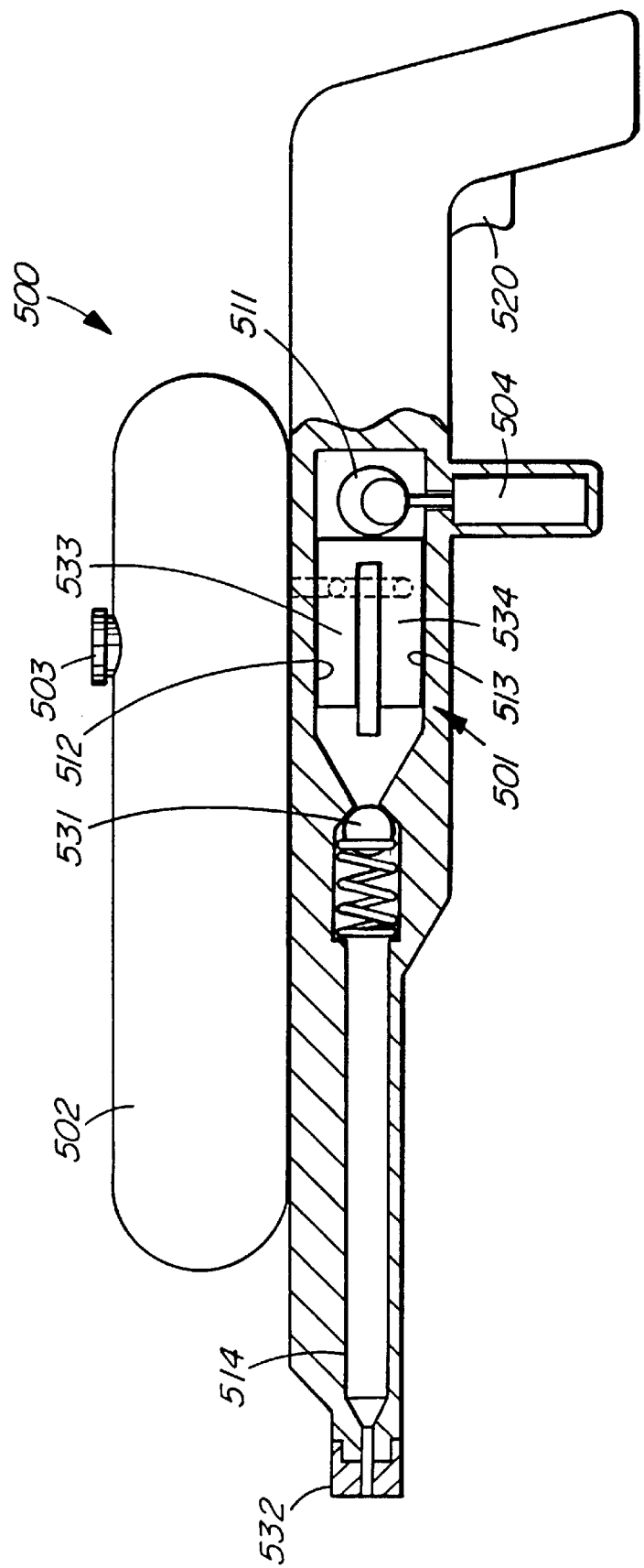
FIG. 11 is a diagrammatic side view of a water pistol according a further aspect of the invention.

Yet a further embodiment of the invention is illustrated in FIG. 11. A water pistol or water rifle is generally illustrated at 500. The water pistol 500 is battery operated and utilises a dual piston assembly generally illustrated at 501 to generate high pressures on a fluid, conveniently water, such that the water can be fired over a good distance.

Water pistol 500 further comprises a reserve water tank 502, a fill cap 503, a motor 504, a battery (not illustrated) to provide power to motor 504 and a cam 511 driven by the motor 504. Water tank 502 supplies water to two parallel fluid cylinders 512, 513 aligned with the barrel 514 of the water pistol 500. A trigger 520 activates the motor 504. Movement of cam 511 drives the dual pistons 533, 534 along the parallel cylinders 512, 513, respectively, reducing the volume available to the fluid and increasing the pressure. At the apex 530 of the fluid cylinders 512, 513 where the cylinders 512, 513 join, a spring loaded check ball valve 531 regulates the entrance of water to the barrel 514. When the fluid in the fluid cylinders 512, 513 reaches sufficient pressure, the ball valve 531 will open and water will enter the barrel 514 under high pressure. The fluid will exit the barrel 514 of pistol 500 through an adjustable nozzle 532.

In operation, the user pulls trigger 520. This completes a circuit which feeds power to orbit motor 504 from a battery (not illustrated). The motor 504 turns the cam 511 and water tank 502 supplies water to the two parallel fluid cylinders 512, 513. As water enters the fluid cylinders 512, 513, the pistons 533, 534 initiates its power stroke. This places the water in fluid cylinders 512, 513 under pressure and causes water to enter the barrel 514 under high pressure and to exit the water pistol 500 through the adjustable nozzle 532.

Conveniently, a manual lever could function as a pistol grip which might also be used to drive the pistons 533, 544, rather than motor 504.

While it has been described in the various embodiments that two pistons move, each in its individual cylinder, it is contemplated that additional pistons, each with its own cylinder, may be conveniently used if the particularly application under which the various apparatuses may be used calls for such modification.

Many further modifications will readily occur to those skilled in the art to which the invention relates and the particular embodiments described herein should be taken as illustrative of the invention only and not as limiting its scope as defined in accordance with the accompanying claims.

I claim:

1. A fuel injector for an engine comprising a first passageway, a first outlet for said first passageway, a first fuel inlet for said first passageway, a second passageway, a second outlet for said second passageway, a second fuel inlet for said second passageway, a first piston movable within said first passageway, a second piston movable within said second passageway, an injector outlet and an apex chamber upstream of said injector outlet, said apex chamber being defined by said first and second outlets of said first and second passageways, said first and second pistons being movable simultaneously in the same direction over at least a portion of said movement of said pistons, each of said first and second pistons being operable to expel fuel entering said first and second passageways from said injector outlet.

2. A fuel injector as in claim 1 wherein said passageways are cylinders.

3. A fuel injector as in claim 2 wherein said pistons move simultaneously in the same direction during said movement of said pistons.

4. A fuel injector as in claim 3 wherein said passageways are parallel.

5. A fuel injector as in claim 4 and further comprising a movable nozzle within said injector, said nozzle having a nozzle tip biased into a contacting relationship with a nozzle tip seat, said nozzle being movable out of contact with said nozzle tip when said fuel within said apex chamber exceeds a predetermined pressure.

6. A fuel injector as in claim 5 and further comprising a fuel supply for supplying said fuel to said first and second fuel inlets for said first and second passageways.

7. A fuel injector as in claim 6 and further comprising a fluid inlet upstream of said first and second pistons to provide fluid operable to move said first and second pistons within said first and second passageways.

8. A fuel injector as in claim 7 wherein said first and second pistons are connected to a piston mounting block, said fluid being operable to move said piston mounting block.

9. A fuel injector as in claim 8 wherein said fluid is operable to move said piston mounting block by a solenoid.

10. A fuel injector as in claim 9 and further comprising a rocker arm to move said piston mounting block.

* * * * *